United States Patent
Cirkic et al.

(10) Patent No.: US 11,363,503 B2
(45) Date of Patent: Jun. 14, 2022

(54) REPORTING AN INDICATION OF ONE OR MORE ESTIMATED SIGNAL PARAMETERS

(71) Applicant: Telefonaktiebolaget LM Ericsson (publ), Stockholm (SE)

(72) Inventors: Mirsad Cirkic, Linköping (SE); Fredrik Gunnarsson, Linköping (SE); Joel Berglund, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 17/052,914

(22) PCT Filed: May 29, 2018

(86) PCT No.: PCT/EP2018/064105
§ 371 (c)(1),
(2) Date: Nov. 4, 2020

(87) PCT Pub. No.: WO2019/228614
PCT Pub. Date: Dec. 5, 2019

(65) Prior Publication Data
US 2021/0076267 A1   Mar. 11, 2021

(51) Int. Cl.
*H04W 36/00* (2009.01)

(52) U.S. Cl.
CPC ... *H04W 36/0061* (2013.01); *H04W 36/0058* (2018.08); *H04W 36/0072* (2013.01)

(58) Field of Classification Search
CPC ... H04W 16/28; H04W 72/046; H04W 24/10; H04W 72/085; H04W 36/30; H04W 36/0085
See application file for complete search history.

(56) References Cited

U.S. PATENT DOCUMENTS

2016/0302128 A1   10/2016   Anchan et al.

OTHER PUBLICATIONS

Mismar, F. et al., "Machine Learning Approach to Estimating mmWave Signal Measurements During Handover", Submission to IEEE Wireless Communication Letters, Oct. 4, 2017, pp. 1-4, IEEE.
Ekman, B., "Machine Learning for Beam Based Mobility Optimization in NR", Master of Science Thesis in Communication Systems, Oct. 1, 2017, pp. 1-85, Linköping University.

*Primary Examiner* — Nam T Huynh
(74) *Attorney, Agent, or Firm* — Coats & Bennett, PLLC

(57) ABSTRACT

In one example aspect, a method is provided of reporting an indication of one or more estimated signal parameters of a signal from a first cell, beam or frequency in a cellular communications network. The method comprises configuring a signal parameter estimation model based on configuration information from a second cell in the cellular communications network, and determining an indication of one or more estimated signal parameters of a signal from the first cell, beam or frequency using the parameter estimation model. The method also comprises sending the indication to the second cell in response to the indication or the one or more estimated signal parameters satisfying one or more criteria.

20 Claims, 4 Drawing Sheets

REPORTING AN INDICATION OF ONE OR MORE ESTIMATED SIGNAL PARAMETERS

TECHNICAL FIELD

Examples of the present disclosure relate to reporting an indication of one or more estimated signal parameters, for example of a signal from a first cell, beam or frequency in a cellular communications network.

BACKGROUND

Mobility in cellular or 3GPP technologies can provide seamless experiences by enabling a handover to be transparent to the user of the UE. This may be an intra-frequency or inter-frequency handover. In LTE, for example, mobility may be handled by the use of cell specific reference signals (CRS).

In 5G, for example, always-on signals such as the CRS may not be present. Instead, mobility may be handled by reference signals or beams that are not always-on. Examples of reference signals that will be used in 5G include synchronization signal (SS), tracking reference signal (TRS) and Channel State Information Reference Signal (CSI-RS), where the TRS and CSI-RS are expected to have narrower beams and be on-demand and UE-specific. In addition, 5G may in some examples operate using higher frequencies than e.g. LTE, meaning that more antennas can fit on a smaller area. This may allow narrower beams.

As the reference signals/beams in 5G may not be always-on, the UE may for example only detect a SS from a neighboring cell without having to activate TRS/CSI-RS beams of the neighboring cell. If the UE wishes to measure on a TRS or CSI-RS from the neighboring cell, this may need to be activated by the neighboring cell, for example in response to explicit signalling.

In some systems, for example cellular or 3GPP systems, the UE may be configured with report triggering criteria, to trigger a measurement report of a signal from a neighboring cell based on measurements associated to either one or two cells using the same frequency carrier. These criteria may be referred to as A1 to A6.

If the report triggering criteria is met, the UE may send a report to its second cell. Such a report may be used to initiate a handover procedure. In a system where one or more beams may not be active all the time (i.e. one or more beams are not always-on), a different action can be to activate one or more beams for the UE to measure on. For example, this may be activating all neighboring beams. For example, neighbouring nodes may allocate resources over which it will transmit reference signals in order for the UE to measure signal properties (e.g. RSRP) of one or more beams of the nodes.

SUMMARY

One aspect of the present disclosure provides a method of reporting an indication of one or more estimated signal parameters of a signal from a first cell, beam or frequency in a cellular communications network. The method comprises configuring a signal parameter estimation model based on configuration information from a second cell in the cellular communications network, and determining an indication of one or more estimated signal parameters of a signal from the first cell, beam or frequency using the parameter estimation model. The method also comprises sending the indication to the second second cell in response to the indication or the one or more estimated signal parameters satisfying one or more criteria.

Another aspect of the present disclosure provides apparatus for reporting an indication of one or more estimated signal parameters of a signal from a first cell, beam or frequency in a cellular communications network. The apparatus comprises a processor and a memory. The memory contains instructions executable by the processor such that the apparatus is operable to configure a signal parameter estimation model based on configuration information from a second cell in the cellular communications network, determine an indication of one or more estimated signal parameters of a signal from the first cell, beam or frequency using the parameter estimation model, and send the indication to the second cell in response to the indication or the one or more estimated signal parameters satisfying one or more criteria.

A further aspect of the present disclosure provides apparatus for reporting an indication of one or more estimated signal parameters of a signal from a first cell, beam or frequency in a cellular communications network. The apparatus is configured to configure a signal parameter estimation model based on configuration information from a second cell in the cellular communications network, determine an indication of one or more estimated signal parameters of a signal from the first cell, beam or frequency using the parameter estimation model, and send the indication to the second cell in response to the indication or the one or more estimated signal parameters satisfying one or more criteria.

A still further aspect of the present disclosure provides apparatus for reporting an indication of one or more estimated signal parameters of a signal from a first cell, beam or frequency in a cellular communications network. The apparatus comprises a configuration module configured to configure a signal parameter estimation model based on configuration information from a second cell in the cellular communications network, and a determination module configured to determine an indication of one or more estimated signal parameters of a signal from the first cell, beam or frequency using the parameter estimation model. The apparatus also comprises a sending module configured to send the indication to the second cell in response to the indication or the one or more estimated signal parameters satisfying one or more criteria.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In some example systems, there may be a large number (for example thousands) of neighboring beams. Therefore, it may be inefficient to activate all of them so that a User Equipment (UE) may measure on all of them. At least some embodiments disclosed herein may provide the UE with a machine learning (ML) model (or parameters for a model) that may provide one or more estimated signal parameters of a signal from a first cell, beam or frequency (e.g. a neighboring cell, beam or frequency). The model may in some examples have one or more triggering criteria, such that the UE reports the result of the ML model, and in some examples a class ID (associated to a set of beams/cells/frequencies) and/or the corresponding class quality, to the base station associated with the first cell, beam or frequency.

Figure 1:
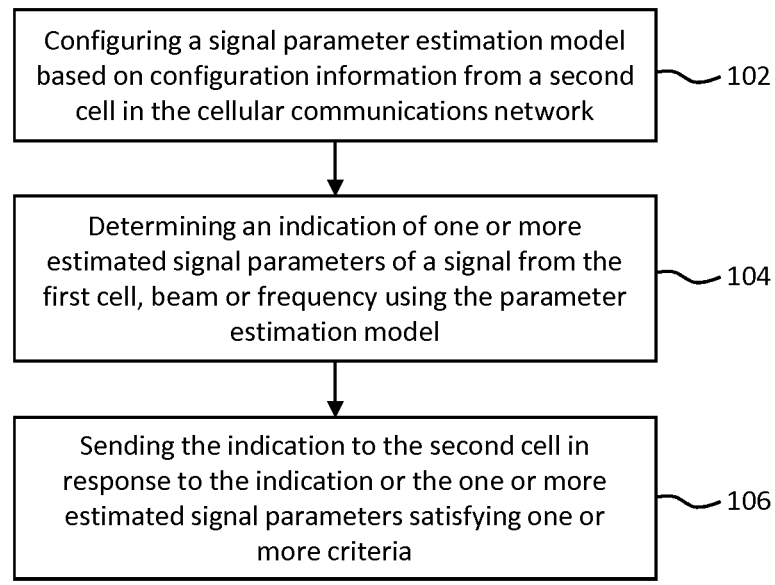
FIG. 1 is a flow chart of an example of a method of reporting an indication of one or more estimated signal parameters of a signal from a first cell, beam or frequency in a cellular communications network.

FIG. 1 is a flow chart of an example of a method 100 of reporting an indication of one or more estimated signal parameters of a signal from a first cell, beam or frequency in a cellular communications network. In some examples, the method 100 may be carried out by a UE. The first cell, beam or frequency may be for example a neighboring beam or frequency and/or a neighboring cell. For example, the first cell, beam or frequency may be a beam or frequency of the second cell or a neighbour cell of the second cell (e.g. the cell serving the device such as a UE implementing the method 100). The method 100 comprises, in step 102, configuring a signal parameter estimation model based on configuration information from a second cell in the cellular communications network.

The method 100 also includes, in step 104, determining an indication of one or more estimated signal parameters of a signal from the first cell, beam or frequency using the parameter estimation model. For example, the model may determine estimated measurements of a reference signal such as a TRS and/or CSI-RS from the first cell, beam or frequency. These estimated measurements may be provided by the model without any measurements of the signal, and may thus be provided even if the signal from the first cell, beam or frequency is not on and has not been activated, and is thus not being transmitted from the first cell, beam or frequency.

In some examples, the configuration information may for example be received from the second cell, such as from a base station of the second cell. In some examples, the configuration information may be used to refine the indication of the one or more estimated signal parameters for a UE implementing the method 100. For example, the configuration information may include one or more of the location of the UE, distance of the UE from a base station of the second cell, velocity of the UE, and one or more capabilities of the UE.

The method 100 further comprises, in step 106, sending the indication to the second cell (e.g. to the base station of the second cell) in response to the indication or the one or more estimated signal parameters satisfying one or more criteria. In an illustrative example, a parameter of a CSI-RS received by a UE (e.g. estimated RSRP, estimated RSRQ and/or estimated received signal strength) from the first cell, beam or frequency, as indicated by the model, may be higher than a threshold. This may then trigger the UE to send a report to the base station of the second cell containing the indication. The indication may then in some examples be used to take further action. For example, the UE, the second cell and/or the communications network containing the second cell may take a decision whether or not to hand over the UE to the first cell, beam or frequency based on the indication. Additionally or alternatively, the signal from the first cell, beam or frequency may be activated such that the UE may take actual measurements of the signal. In some examples, the actual measurements may be sent to the second cell (e.g. in response to the measurements meeting one or more criteria). In some examples, the actual measurements may be used in a decision whether to hand over the UE. Additionally or alternatively, the actual measurements may be used to improve the model and/or configuration information for the model.

In some examples, the one or more criteria comprises the indication or the one or more estimated signal parameters exceeding a predetermined threshold. For example, the model may provide an estimated signal strength, TRS and/or CSI-RS for the first cell, beam or frequency, and the one or more criteria may include that the estimated signal strength, TRS and/or CSI-RS exceeds a predetermined threshold. Additionally or alternatively, for example, the one or more criteria may include that the indication of the one or more estimated signal parameters (e.g. signal strength) exceeds the signal parameters (estimated or measured) of a similar signal (e.g. TRS and/or CSI-RS) from the second cell, beam or frequency.

In some examples, determining the indication in step 104 comprises determining, from the parameter estimation model, one or more model outputs, wherein each model output comprises an indication of one or more estimated signal parameters of a signal from a respective one or more of a plurality of cells, beams or frequencies, and wherein the first cell, beam or frequency comprises one of the plurality of cells, beams or frequencies. The model may therefore provide for example estimated signal parameters for a plurality of neighboring cells, beams or frequencies. Each indication may indicate a probability that a signal strength of a signal from the respective cell, beam or frequency is higher than a signal strength of a signal from the second cell or a second beam or frequency (e.g. a serving cell or a serving beam or frequency). In some examples, the one or more criteria comprises a total of the probabilities exceeding a threshold. Therefore, for example, a higher total probability may indicate that at least one of the plurality of cells, beams or frequencies may be suitable for a UE to be handed over to, according to the estimates provided by the model.

In some embodiments, the configuration information is based on one or more measured signal parameters of the signal from the first cell, beam or frequency. For example, the configuration may be based at least in part on measurement reports previously sent to the second cell from UEs, such as for example UEs served by the second cell, and/or sent to the second cell from other cells.

In some embodiments, the method 100 includes sending the indication to the second cell to cause a reference signal (e.g. TRS and/or CSI-RS) to be transmitted on the first cell, beam or frequency. The device implementing the method 100 (e.g. a UE) may then measure one or more signal parameters of the reference signal, and sending an indication of the measured signal parameters to the second cell. In some examples, the device may perform a handover to the first cell, beam or frequency based on the measured signal parameters (e.g. the handover may be initiated by the UE or instructed by the second cell based on the measured signal parameters).

In some examples, determining the indication using the parameter estimation model comprises providing one or more of a signal strength of a signal from the second cell, Channel State Information Reference Signal (CSI-RS) of a reference signal from the second cell, distance from a base station of the second cell, and/or velocity to the parameter estimation model. For example, the model may predict a distance, velocity and/or location of the UE and this may in some examples be used by the model to determine the estimated signal parameters.

In some examples the second cell is a serving cell of the device (e.g. UE) carrying out the method 100.

Figure 2:
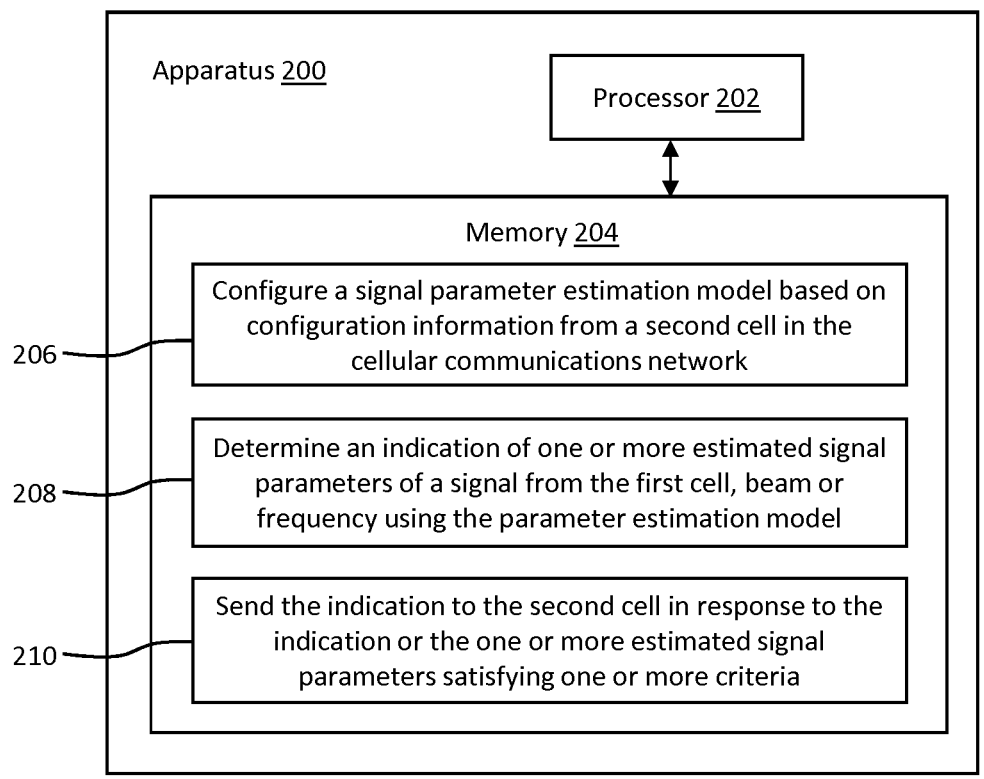
FIG. 2 shows an example of apparatus for reporting an indication of one or more estimated signal parameters of a signal from a first cell, beam or frequency in a cellular communications network.

FIG. 2 shows an example of apparatus 200 for reporting an indication of one or more estimated signal parameters of a signal from a first cell, beam or frequency in a cellular communications network. The apparatus comprises a processor 202 and a memory 204. The memory 204 contains instructions 206 executable by the processor 202 such that the apparatus 200 is operable to configure a signal parameter estimation model based on configuration information from a second cell in the cellular communications network. The memory 204 also contains instructions 208 executable by the processor 202 such that the apparatus 200 is operable to determine an indication of one or more estimated signal parameters of a signal from the first cell, beam or frequency using the parameter estimation model, and instructions 210 executable by the processor 202 such that the apparatus 200 is operable to send the indication to the second cell in response to the indication or the one or more estimated signal parameters satisfying one or more criteria. In some examples, the memory 204 contains instructions executable by the processor 202 such that the apparatus 200 is operable to carry out the method 100 of FIG. 1. In some examples, the apparatus 200 comprises a User Equipment (UE). The second cell may be for example a serving cell of the apparatus 200.

Figure 3:
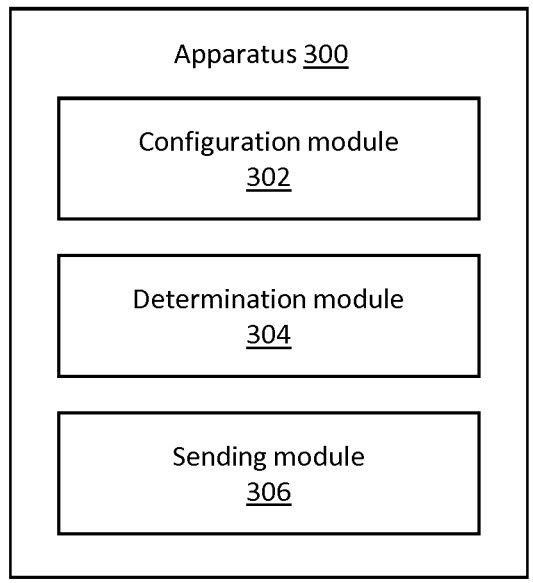
FIG. 3 shows an example of apparatus for reporting an indication of one or more estimated signal parameters of a signal from a first cell, beam or frequency in a cellular communications network.

FIG. 3 shows an example of apparatus 300 for reporting an indication of one or more estimated signal parameters of a signal from a first cell, beam or frequency in a cellular communications network. The apparatus comprises a configuration module 302 configured to configure a signal parameter estimation model based on configuration information from a second cell in the cellular communications network. The apparatus 300 also comprises a determination module 304 configured to determine an indication of one or more estimated signal parameters of a signal from the first cell, beam or frequency using the parameter estimation model, and a sending module 306 configured to send the indication to the second cell in response to the indication or the one or more estimated signal parameters satisfying one or more criteria. The second cell may be for example a serving cell of the apparatus 300.

In some examples, the methods and apparatus disclosed herein may be operable within a 5G or NR (New Radio) communications network. Particular examples and embodiments will now be described below.

Figure 4:
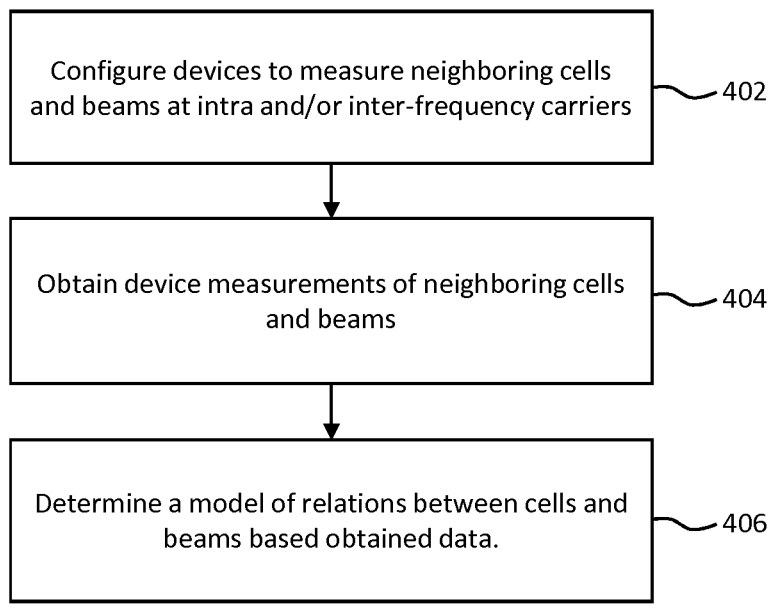
FIG. 4 is an example of a flow chart that illustrates a model training procedure.

FIG. 4 is an example of a flow chart that illustrates an optional model training procedure 400 (e.g. determining configuration information) from a network node perspective, where a network node configures (step 402) devices to measure on beams and cells. Such configuration can be accompanied with an activation of most beams and cells to enable extensive measurements. The devices will measure and report measurements, which are obtained (e.g. received) by the network node (step 404), which are used to train a model in the network node (step 406). The network node in these steps may be distributed over several nodes, where the model training is in one node (such as a core network node), while the configuration is via a separate node (such as a base station). For example, the configuration information is sent to UEs via the base station.

Figure 5:
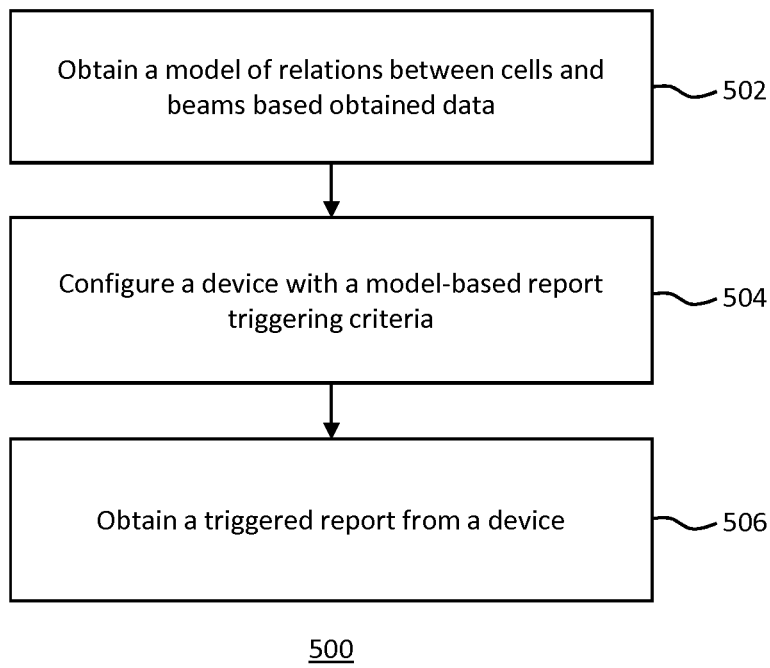
FIG. 5 is an example of a flow chart that illustrates a method relating to an actuation of the model for report triggering.

FIG. 5 is an example of a flow chart that illustrates a method 500 relating to an actuation of the model for report triggering, where a network node optionally obtains (step 502), for example from a different network node, a model (or a set of models) to be used for report triggering. The model is configured in the device (e.g. UE) from the network node (step 504), such as for example via or by a base station of a second cell of the UE. When a model evaluation satisfies a triggering criterion, the network node obtains a report from the UE (step 506). The trigger criterion can be based on the result of the ML model, which can in some examples be a probability measure that a frequency or beam in another node (which may in some examples be not active and not possible to measure on) is stronger than the currently serving beam. The triggered report can in turn contain estimated quality measures on beams, frequencies or cells that have not been activated (i.e. one or more reference signals are not being transmitted) and thus not possible to be measured when the report was constructed. The quality measure would be solely based on the ML model evaluation. Therefore, there is no need to activate and measure the target beams or cells for the UE to report information. Optionally, in some examples, the network node may activate beams, or signal to other nodes to activate beams, and then optionally configure the UE to perform measurements of these newly activated beams. Optionally, the network node may initiate handover, for example based on actual measurements of the beams or the measurements from the model.

Figure 6:
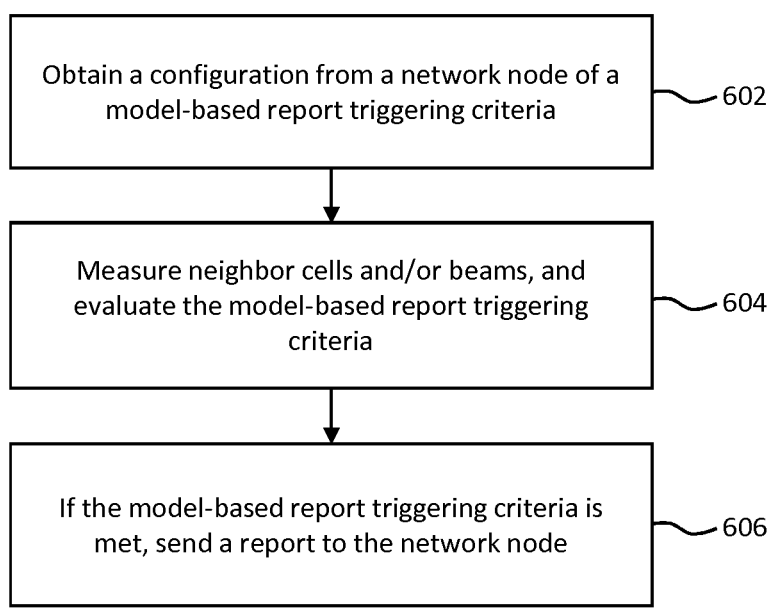
FIG. 6 shows an example of a method for example carried out by a device such as a UE.

FIG. 6 shows an example of a method 600, for example carried out by a device such as a UE. The device optionally obtains a model from the network node (step 602) to be used for report triggering evaluations. The device obtains measurements and performs evaluations based on the obtained model (step 604), for example by measuring or estimating parameters of neighbor cells and/or beams, and evaluating the model-based report triggering criteria. When a report triggering criteria has been met, the device sends a report to the network node (606).

In some examples, the model may be continuously updated by the base station of the second cell or by one or more network nodes and sent to the UE, for example upon cell attach, in connection with a report configuration, periodically and/or in response to a trigger or event. The training of the model can be based on any report configuration that contains the relevant information, such as those that set up the A1-A6 events, and not only based on the configurations proposed herein which make the UE use the ML model for reporting purposes. The new configuration can constitute several different report and triggering setups as follows.

The model itself can take use of different inputs and could also be designed with different types of output. In some examples, the model can be in the form f(x, ID)→y, where
- ID is a class which is associated with a set of one or more beams, cells and/or frequencies. The ith ID class is denoted $ID_i$.
- x is a vector of input features such as SS, TRS and/or CSI-RS (e.g. requested output indications) and/or one or more other aspects such as the estimated distance of a device such as a UE from the base station or velocity of the device.
- y is a ML model generated metric such as estimated radio signal strength, probability of coverage, probability of being better than a reference signal, eg serving beam.

The trigger criterion can be for example:
$g(\{f(x,ID_i); i \in \mathbb{I}\}) \gtreqless \eta$, where $\eta$ is a threshold and $g(\bullet)$ can be, but not limited to, $\Sigma_i \alpha_i f(x,ID_i)$ or $$\max_i f(x, ID_i).$$

In some embodiments, a combination of triggers can constitute a trigger criterion. In another embodiment, the trigger criterion needs to be fulfilled for a certain time period or number of trigger occurrences.

The report from the UE to the network can in some examples indicate one or more of the following:
$h(f(x, ID_1), \ldots, f(x, ID_N)) \to ID_k$ belonging to a set of IDs, where $h(\bullet)$ can be for example $\text{argmax}_i (f(x, ID_i))$ IDs which fulfill the trigger criterion ML model generated metrics associated to the corresponding IDs that fulfill the trigger criterion ML model generated metrics associated to a preconfigured set of IDs Collected measurements according to a report configuration In some embodiments, the report can be a combination of collected measurements, IDs, and ML model generated metrics.

A simplified example comprises a UE being served by a base station BS2, which has three CSI-RS beams. There is also a neighbor base station BS1, which has five CSI-RS beams. If there are no UEs being served by BS1, the CSI-RS of BS1 or any of its five beams would not be on. Instead, the UE would only be able to measure a SS of BS1 and BS2 as well as its serving CSI-RS.

In the case with a ML model at the UE, previously designed/trained/configured by base station BS2, the UE may for example transmit a report based on the output of the model to BS2 according to one or more trigger criteria, possibly indicating that the UE has a need to find appropriate neighboring beams, cells or frequencies, or has found (due to estimated signal parameters) one or more suitable neighboring beams, cells or frequencies, and in some examples an indication of which beams, cells or frequencies are appropriate (e.g. may provide suitable coverage or may have a stronger signal strength than the serving beam, cell or frequency).

In some examples, it is assumed that the model has four output classes and that the UE is instructed to report the results when the sum of the outputs (e.g. probabilities) is greater than 1. In this case, the first output class indicates the probability of having coverage in beam 1-2 of BS1, the second output class indicates the probability of having coverage in beam 2-3 of BS1, third output class indicates the probability of having coverage in beam 3-4 of BS1, and fourth output class indicates the probability of having coverage in beam 4-5 of BS1. The internal result of the model at different times (t=0 ms, 1000 ms and 2000 ms) could be for example information according to the table below:

| Time [ms] | 0 | 1000 | 2000 |
|---|---|---|---|
| ML outputs [f (x, $ID_1$), f (x, $ID_2$), f (x, $ID_3$), f (x, $ID_4$)] | [0, 0.2, 0.25, 0] | [0, 0.4, 0.5, 0] | [0, 0.6, 0.5, 0] |
| g(f (x, $ID_1$), . . . , f (x, $ID_4$)) = $\Sigma_i$f (x, $ID_i$) | 0.45 | 0.85 | 1.1 |
| Trigger with $\eta \geq$ 1.0 | No | No | Yes |
| ML input [BS1 SS, BS2 SS, BS2 CSI-RS signal strength, BS2 CSI-RS ID] | [−110, −90, −70, 2] | [−105, −95, −75, 2] | [−102, −98, −82, 2] |
| h(f (x, $ID_1$), . . . , f (x, $ID_4$)) = argmax$_i$(f (x, $ID_i$)) | 3 | 3 | 2 |

According the table above and the trigger assumptions, the UE should report its results to BS2 due to the model output at T=2000 ms. In this case, 0.6 of output class 2 and 0.5 of class 3 would indicate that the UE is expected to have slightly higher probability of having better coverage by beam 2 or 3 than beam 3 or 4 and that the UE is likely to have coverage (e.g. probability of at least 0.5) of any of beam 2-4 from BS1. As this is reported to BS2, BS1 is told (e.g. by BS1 or by a network node) to activate beam 2-4 (e.g. activate a reference signal on those beams) and the UE may search for or measure them. For example, the UE may be explicitly signaled (e.g. by BS2) to measure on them.

Figure 7:
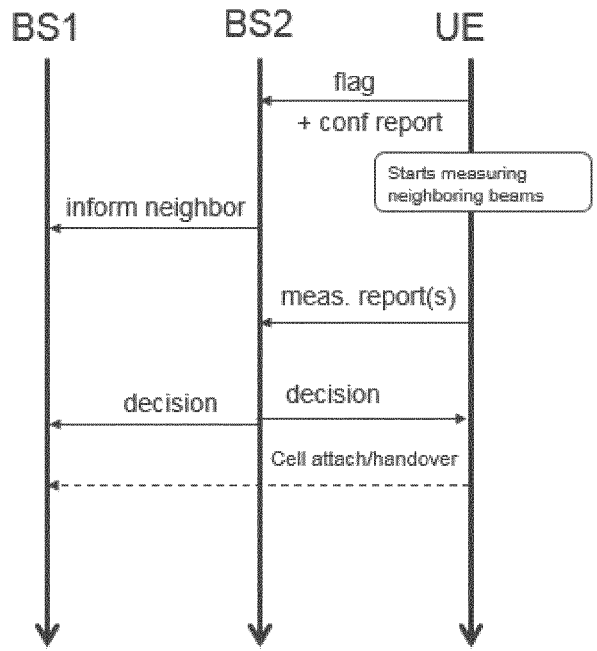
FIG. 7 shows an example of communications within a communications network.

In some embodiments, the UE sends the triggered (configured) report and is implicitly instructed to measure on a set of beams/resources based on the determined class IDs and/or the ML generated metrics. At a later, separate stage, the UE may send collected measurements in a separate measurement report. Communications between BS1, BS2 and the UE may then for example be those illustrated in FIG. 7, which shows an example of communications within a communications network according to some embodiments.

Figure 8:
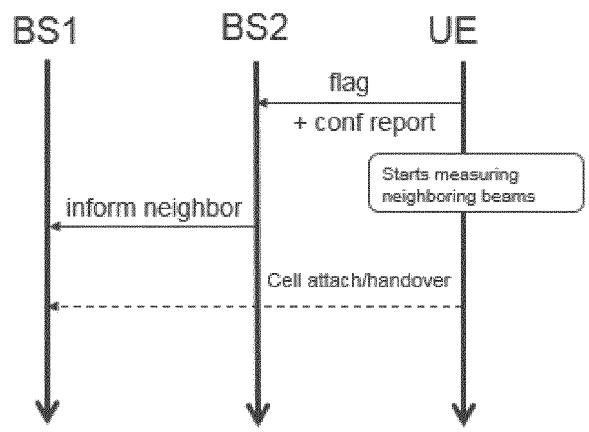
FIG. 8 shows an example of communications within a communications network.

In some embodiments, the UE makes a handover directly to BS1 if the quality of its beams are good enough, without explicit signaling to BS2. Communications between BS1, BS2 and the UE may then for example be those illustrated in FIG. 8, which shows an example of communications within a communications network according to some embodiments.

In some embodiments, the trigger for making a blind handover (e.g. one not explicitly instructed by a node of the network such as a base station) may be preconfigured by the network, for example allowing the handover to be done by the UE with certain quality requirements (e.g. measured or estimated parameters of a signal from a cell, beam or frequency to be handed over to) without signaling to the serving node.

In some embodiments, the parameters (e.g. configuration information) of a ML model may be sent to the UE. For example, a support vector machine $f(x)=\Sigma_i \alpha_i K(x_i, x)+b$, which consists of a predefined kernel function and whose parameters are given by $x_i$, $\alpha_i$ and b. Example of a kernel function is $\exp(-\gamma\|x_i-x\|^2)$. The total number of parameters may in some examples be no more than in the order of 10 and may in some examples not be signaled to the UE more than once, e.g., at cell attach. The vector x can in some examples, as illustrated in the example table above, consist of measurements on the available source CSI-RS, source SS and neighboring SS.

In some embodiments, a ML model is placed or configured with its corresponding triggers at the UE, which may allow for the model to be evaluated continuously or periodically at the UE and hence base the triggers and reports on the results from the ML model. Thus, both the triggers and the reports can in some examples be based on quantities which the UE is not able to measure but is able to estimate (predict) with a ML model. For example, the UE can trigger a report based on a probability measure of having a better beam (e.g. of higher signal strength than a serving beam) in a neighboring node (or from the same second cell) and include in the report the ID of that beam, even if the beam was not activated (e.g. was not transmitting a reference signal such as TRS and/or CSI-RS).

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of reporting an indication of one or more estimated signal parameters of a signal from a first cell, beam, or frequency in a cellular communications network, the method comprising:
configuring a signal parameter estimation model based on configuration information from a second cell in the cellular communications network;
determining an indication of one or more estimated signal parameters of a signal from the first cell, beam, or frequency using the parameter estimation model; wherein the one or more estimated signal parameters comprise an estimated measurement of a reference signal from the first cell, beam, or frequency; and
sending the indication to the second cell in response to the indication or the one or more estimated signal parameters satisfying one or more criteria.

2. The method of claim 1, wherein the one or more criteria comprises the indication or the one or more estimated signal parameters exceeding a predetermined threshold.

3. The method of claim 1:
wherein the determining the indication comprises determining, from the parameter estimation model, one or more model outputs;
wherein each model output comprises an indication of one or more estimated signal parameters of a signal from a respective one or more of a plurality of cells, beams, or frequencies; and
wherein the first cell, beam, or frequency comprises one of the plurality of cells, beams, or frequencies.

4. The method of claim 3, wherein each indication indicates a probability that a signal strength of a signal from the respective cell, beam, or frequency is higher than a signal strength of a signal from the second cell or a serving beam or frequency.

5. The method of claim 4, wherein the one or more criteria comprises a total of the probabilities exceeding a threshold.

6. The method of claim 1, wherein the estimated measurement of the reference signal from the first cell, beam, or frequency comprises an estimated reference signal strength or an estimated measurement of a Channel State Information Reference Signal (CSI-RS).

7. The method of claim 1, wherein the indication indicates a probability that a signal strength of a signal from the first cell, beam, or frequency is higher than a signal strength of a signal from the second cell or a serving beam or frequency.

8. The method of claim 1, wherein the first cell, beam, or frequency comprises a beam or frequency of the second cell or a neighbor cell of the second cell.

9. The method of claim 1, wherein the configuration information is based on one or more measured signal parameters of the signal from the first cell, beam, or frequency.

10. The method of claim 9, wherein the signal from the first cell, beam, or frequency comprises a reference signal.

11. The method of claim 1, further comprising sending the indication to the second cell to cause a reference signal to be transmitted on the first cell, beam, or frequency.

12. The method of claim 11, further comprising measuring one or more signal parameters of the reference signal, and sending an indication of the measured signal parameters to the second cell.

13. The method of claim 12, further comprising performing a handover to the first cell, beam, or frequency based on the measured signal parameters.

14. The method of claim 1, further comprising performing a handover to the first cell, beam, or frequency based on the indication of the one or more estimated signal parameters.

15. The method of claim 1, wherein the indication indicates an estimated signal strength of a signal on the first cell, beam, or frequency.

16. The method of claim 1, wherein the determining the indication using the parameter estimation model comprises providing a signal strength of a signal from the second cell, a measurement of a Channel State Information Reference Signal (CSI-RS) from the second cell, a distance from a base station of the second cell, and/or a velocity to the parameter estimation model.

17. The method of claim 1, wherein the method is carried out by a User Equipment (UE).

18. The method of claim 1, wherein the second cell comprises a serving cell.

19. An apparatus for reporting an indication of one or more estimated signal parameters of a signal from a first cell, beam, or frequency in a cellular communications network; the apparatus comprising:
processing circuitry;
memory containing instructions executable by the processing circuitry whereby the apparatus is operative to:
configure a signal parameter estimation model based on configuration information from a second cell in the cellular communications network;
determine an indication of one or more estimated signal parameters of a signal from the first cell, beam, or frequency using the parameter estimation model; wherein the one or more estimated signal parameters comprise an estimated measurement of a reference signal from the first cell, beam, or frequency; and
send the indication to the second cell in response to the indication or the one or more estimated signal parameters satisfying one or more criteria.

20. The apparatus of claim 19, wherein the one or more criteria comprises the indication or the one or more estimated signal parameters exceeding a predetermined threshold.

* * * * *